United States Patent [19]

Moore et al.

[11] 4,281,367

[45] Jul. 28, 1981

[54] SUBMERSIBLE LAMP WIRING TERMINALS

[76] Inventors: Dennis G. Moore, 576 Debra, Livermore, Calif. 94550; Lawrence N. Johnson, 130 W. High St., Spokane, Wash. 99203

[21] Appl. No.: 44,923

[22] Filed: Jun. 4, 1979

[51] Int. Cl.³ .............................................. F21V 33/00
[52] U.S. Cl. .................................... 362/96; 362/267; 362/276
[58] Field of Search ........................ 362/267, 276, 96

[56] References Cited

U.S. PATENT DOCUMENTS 3,902,057  8/1975  La Violette .......................... 362/267

Primary Examiner—Stephen J. Lechert, Jr.
Attorney, Agent, or Firm—August E. Roehrig, Jr.

[57] ABSTRACT

A submersible lamp having a housing and a lens with a bulb carried therein in optical alignment with the lens. A pair of terminal connections are provided for electrically coupling the bulb to a source of illuminating energy. The housing forms an open air chamber to define a volume of air such that upon submersion of the housing in water, the air is compressed to create a force sufficient to prevent the water from rising within the housing above a pre-determined level into contact with the bulb and terminal connections.

7 Claims, 3 Drawing Figures

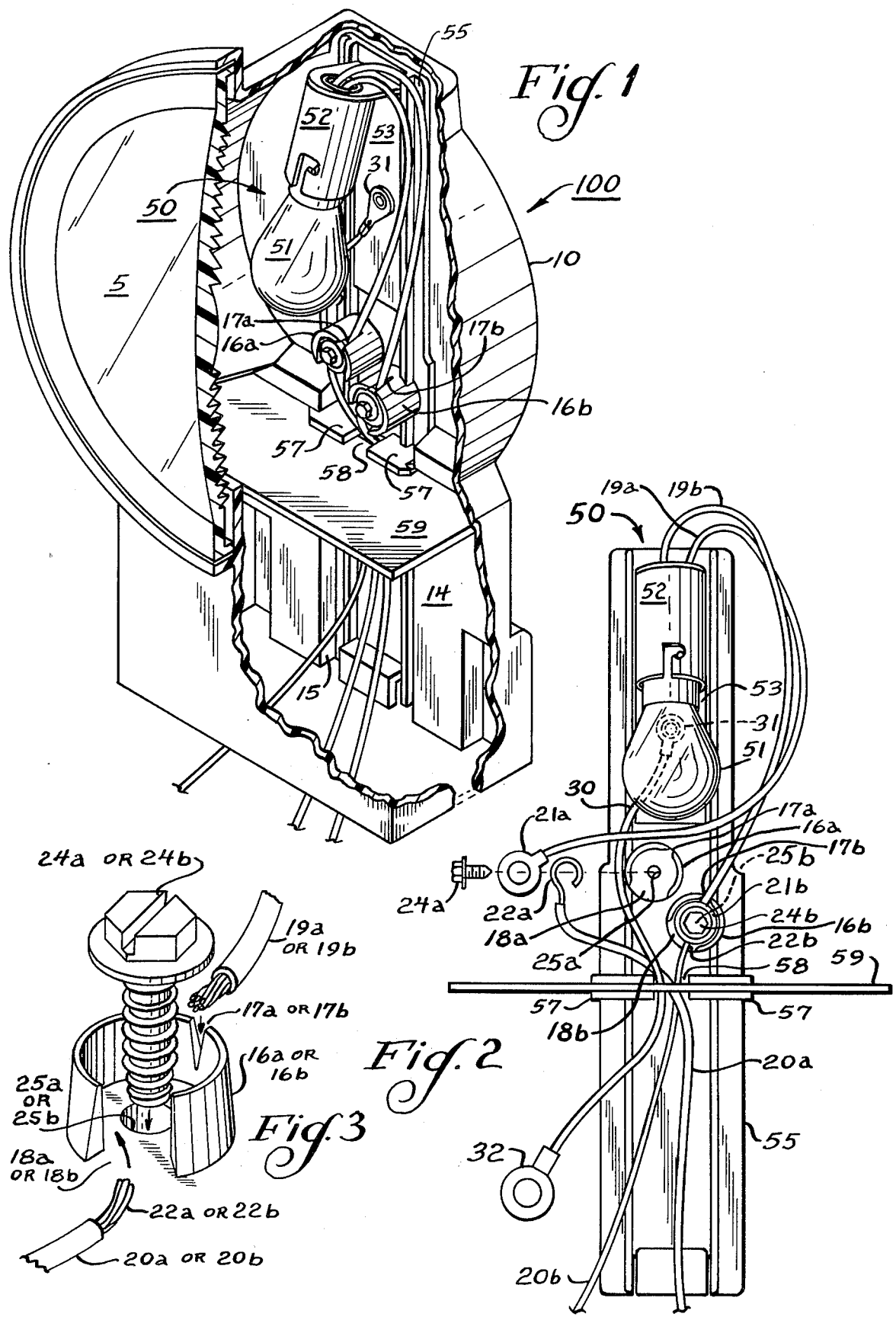

SUBMERSIBLE LAMP WIRING TERMINALS

BACKGROUND OF THE INVENTION

This invention relates in general to lamp assemblies and, in particular, to a lamp assembly adapted for submersion in a liquid.

More specifically, this invention relates to a submersible lamp assembly which upon submersion in liquid compresses air within the lamp housing to prevent the liquid from rising above a predetermined level into contact with an electric lamp or its electrical terminal connections positioned therein.

Lighting equipment utilized on boat trailers is continuously subjected to submersion in water when the trailer carrying the boat is manuevered into the water to allow a boat to be launched or retrieved from the water. As is well known, federal, state, and/or municipal vehicle codes require boat trailers to be equipped with signal lamps which function as tail lamps, stop lamps, turn signals, etc. These lamps are submerged in water during boat launching or loading, which is not encountered by signal lamps used on other types of vehicles.

This repetitive submersion of the signal lamp in water, especially salt water, has caused the bulb and bulb socket to corrode due to moisture which forms or becomes entrapped inside the lamp housing. The terminal connections which have heretofore been directly in contact with the water, frequently rust or corrode causing the electrical connection between the trailer electrical system and the bulb assembly to break, thereby rendering the lamp assembly inoperative.

Various attempts have been made to provide a satisfactory signal lamp assembly for use on boat trailers. Lamps such as disclosed in U.S. Pat. No. 3,106,349 and U.S. Pat. No. 3,858,039, have solved the problem of bulb and bulb socket corrosion, and bulb breakage caused by submersion of the lamp in water. However, the terminal connections in these as well as previous lamp assemblies, were located such that the terminal connections were submerged when the trailer was submerged in water. After repeated submersions of the terminal connections, the terminal connections become corroded and eventually deteriorate causing the lamp to lose its source of illuminating power.

The present invention prevents corrosion of the terminal connections, by positioning the terminal connection above the level to which water rises in the lamp housing. Thus, the terminal connections remain dry and do not come into contact with the water, which prevents corrosion of the wire connections, and provides a single location to trouble-shoot all connections.

SUMMARY OF THE INVENTION

It is therefore, an object of this invention to improve lamp assemblies.

Another object of this invention is to improve submersible lamp assemblies.

A further object of this invention is to prevent corrosion at the terminal connections of submersible lamp assemblies.

These and other objects of the present invention are attained in accordance with the present invention wherein there is provided a submersible lamp assembly having a housing with a bulb and bulb socket positioned therein in optical alignment with the lens, and a pair of terminal connections located adjacent to the bulb and bulb socket and above a pre-determined level within the housing. The housing forms an open air chamber enclosing the bulb, bulb socket, and terminal connections to define a volume of air such that upon submersion of the housing in a liquid, the predetermined volume of air is compressed to create a force sufficient to prevent the liquid from rising above a predetermined level and into contact with the bulb, bulb socket, and terminal connections.

DESCRIPTION OF THE DRAWINGS

A further object of this invention, together with additional features contributing thereto and advantages accruing therefrom, will be apparent from the following description of a preferred embodiment of the invention when read in conjunction with the accompanying drawings, wherein:

FIG. 1 is a frontal perspective view of a lamp assembly having portions removed to illustrate a bulb socket assembly, and its terminal connections positioned within the lamp housing;

FIG. 2 is a front view showing the bulb socket assembly, terminal connections, and an exploded view of a portion of the wiring utilized in the lamp assembly.

FIG. 3 is an isolated view of either terminal shroud utilized in accordance with the present invention.

DESCRIPTION OF THE PREFERRED EMBODIMENT

Referring now to FIG. 1, there is shown a lamp assembly 100 including a lamp housing 10. The housing 10 forms an air chamber with the bottom of the housing 10 being open to the normal atmosphere to permit the passage of air into the housing. The air chamber defines a sufficient volume of air such that when the lamp assembly 100 is submerged in water, the volume of air in the housing 10 is compressed to create a force sufficient to prevent water from rising above a predetermined level within the housing 10, generally less than one inch and usually one-half inch. The housing 10 carries a lens 5 which is of a standard design dependent upon and complying with the particular function the lamp is to perform.

The rear wall 14 of the housing 10 has a channel 15 which is adapted to receive and position an electric lamp assembly 50. The electric lamp assembly 50 includes a bulb 51, carried by a bulb socket 52, and positioned in optical alignment with the lens 5. The bulb 51 and bulb socket 52 are carried by a bulb support bracket 53 which forms a portion of the electrical circuitry to ground the lamp. The bulb support bracket 53 is carried on a bulb slide 55, which is insertable into and removable from the housing 10 through the opening in the bottom of the lamp housing 10. The bulb slide 55 is positioned by the channel 15 formed in the rear wall 14 of the housing 10 so that the bulb 51 will be in optical alignment with the lens 5. Brackets 57 are carried by the bulb slide 55 to support a dust window or splash guard 59 which functions to prevent dirt from passing above the guard 59, but allows the free flow of air. For a more detailed description of the operation of the lamp assembly during submersion in a liquid, reference is made to Dennis G. Moore, U.S. Pat. No. 3,858,939, "LAMP ASSEMBLY", the disclosure of which is incorporated herein by reference.

Turning to FIG. 2, a pair of lead wires 19a and 19b are connected to the bulb socket 52 of the electric lamp assembly 50. In order to provide power to illuminate the bulb 51, the lead wires 19a and 19b must be connected, respectively, to another pair of lead wires 20a and 20b which are coupled to an electrical system of a trailer or vehicle upon which the lamp assembly 100 is mounted. To this end the bulb slide 55 carries terminal shrouds 16a and 16b which function as a wire guide and shroud to facilitate coupling the lead wires 19a and 20a, and 19b and 20b, respectively.

The terminal shrouds 16a and 16b are carried on the bulb slide 55 at a position well above the level that water will rise within the housing 10 when the lamp assembly 100 is submerged and adjacent the dust guard 59 for a purpose to be hereinafter discussed in detail. When the lamp assembly is submerged, the volume of air within the housing 10 will be compressed, thereby creating a force sufficient to prevent water from rising above a predetermined level. The location of the terminal shrouds 16a and 16b above this level will insure that the terminal couplings between the lead wires 19a and 20a, and the lead wires 19b and 20b, will remain dry thereby preventing corrosion of the wire couplings or terminals. By positioning the terminal shrouds 16a and 16b above the dust guard 59, instructions can be printed or molded onto the dust guard 59 with regard to the connections to be made.

In order to facilitate an electrical connection between the wires 19a and 19b of the electric lamp assembly 50, and the wires 20a and 20b from the electrical system of the trailer or vehicle to which the lamp is connected, the tips of the wires 19a and 19b may have metal eyelets 21a and 21b attached thereto, as shown in FIG. 2. The ends 22a and 22b of the secondary wires 20a and 20b are stripped of insulation so that the bare wire ends are exposed. While the ends of the wires from the electric lamp assembly 50 are shown with eyelet connectors 21a and 21b, it is to be understood that the ends thereof may be merely stripped like ends 22a and 22b, as is shown in FIG. 3.

The terminal shrouds 16a and 16b have tapered slots 17a and 17b respectively, which allow the wires 19a and 19b to be wedged therein so that the ends thereof are securely positioned within the shrouds. A suitable fastener, such as screws with washers 24a and 24b are inserted into holes 25a and 25b, respectively, and partially screwed toward the bottom of the shrouds 16a and 16b to insure that the wires 19a and 19b are securely held in place.

To couple the lead wires 19a and 19b from the electric lamp assembly 50 to the vehicle or trailer electrical system, the wires 20a and 20b are passed through an opening 58 formed between the bulb slide 55 and the dust guard 59. The ends 22a and 22b of the wires 20a and 20b are sufficiently flexible such that as the wires are fed through the opening 58, they are guided into the terminal shrouds 16a and 16b. Each terminal shroud is positioned such that an aperture 18a and 18b, respectively, in its peripheral shoulder, is adjacent to the opening 58. The interior wall of each terminal shroud is formed such that a wire inserted through the aperture 18a and 18b will follow the contour of the interior wall and be curved around the pre-started screws 24a and 24b into a somewhat circular configuration (shown in FIG. 2) to aid in forming a secure electrical coupling.

The ends 22a and 22b of the wires 20a and 20b enter the shrouds 16a and 16b to the left of the screws 24a and 24b, respectively, so that when the screws are tightened, the ends are not expelled from the shrouds by the friction of the washer under the head of the screws 24a and 24b. When the wires 20a and 20b are properly positioned, then the screws 24a and 24b are tightened down to insure that a satisfactory electrical connection is made between wires 19a and 19b and wires 20a and 20b.

The electric lamp assembly 50 further includes a ground wire 30 which is connected at one end 31 to the bulb bracket 53, and has another end 32 which is connected to the vehicle or trailer to insure proper ground. When the wires 19a and 20a, and 19b and 20b, are properly interconnected and the electric lamp assembly 50 is properly grounded, the lamp assembly 100 is then electrically coupled to the electrical system of the trailer or vehicle so that upon application of power by the electrical system, the lamp assembly 100 will thereby be illuminated.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. In a submersible electric lamp having a housing defining an enclosure for retaining a predetermined volume of air and an opening formed in said housing through which liquid may pass such that upon submersion of said housing in liquid to a level below said opening formed therein said predetermined volume of air will be compressed creating a force sufficient to prevent the liquid which may pass within said housing from rising above a predetermined level, and an electric lamp carried within said housing above said predetermined level and having electrical leads for coupling said electric lamp to a source of illuminating electrical energy for lighting said electrical lamp, the improvement comprising terminal coupling means carried within said lamp housing at a position above said predetermined level to which liquid will rise therein for electrically coupling said electrical leads to a source of illuminating electrical energy and thereby preventing contact of the coupling with the liquid when submerged therein.

2. The apparatus of claim 1 wherein said terminal coupling means are carried by a bulb slide positionable within said housing through an opening formed therein.

3. The apparatus of claim 1 wherein said terminal coupling means comprises a terminal shroud formed with an interior wall having an opening therein and substantially circular in configuration.

4. The apparatus of claim 2 wherein said terminal coupling means comprises a substantially cylindrical terminal shroud extending outwardly from said bulb slide and having an opening therein for receiving an electrical lead wire.

5. The apparatus of claim 4 further including means for securing an electrical lead wire within said terminal shroud.

6. The apparatus of claim 4 wherein said terminal shroud has a substantially circular interior wall and said opening formed therein is positioned to cause an electrical wire passed therethrough to engage said interior wall and be flexed into a configuration conforming substantially thereto.

7. The apparatus of claim 1 wherein said electric lamp and said terminal coupling means are both carried by a bulb slide positionable within said housing through an opening formed therein.

* * * * *